Figure 1:
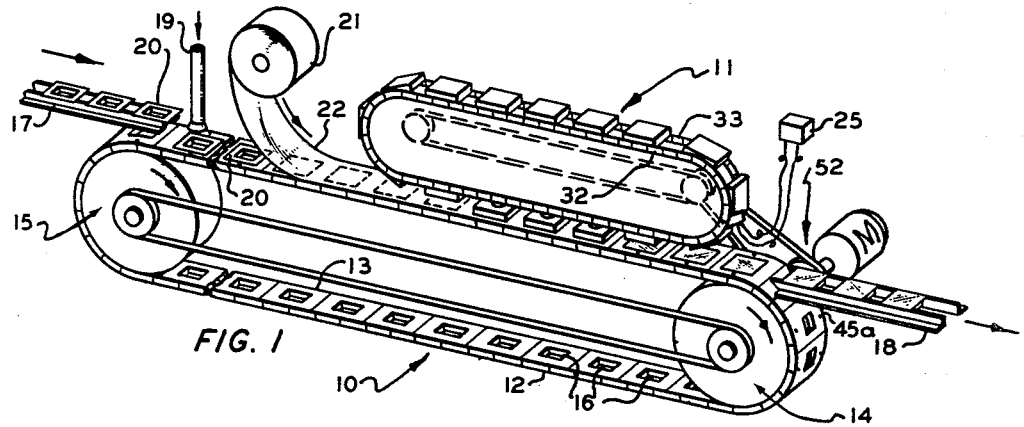

Oct. 6, 1964  G. E. MADER, JR., ETAL  3,151,428
AUTOMATIC IMPULSE HEAT SEALING
Filed Nov. 3, 1961  2 Sheets-Sheet 1

INVENTORS
G.E. MADER, JR.
E.C. BEASON

BY

*Young and Quigg*

ATTORNEYS

Oct. 6, 1964  G. E. MADER, JR., ETAL  3,151,428
AUTOMATIC IMPULSE HEAT SEALING
Filed Nov. 3, 1961                                    2 Sheets-Sheet 2

INVENTORS
G.E. MADER, JR.
E.C. BEASON
BY
*Young and Quigg*
ATTORNEYS

United States Patent Office 3,151,428
Patented Oct. 6, 1964

3,151,428
AUTOMATIC IMPULSE HEAT SEALING
George E. Mader, Jr., and Elmer C. Beason, both of Bartlesville, Okla., assignors to Phillips Petroleum Company, a corporation of Delaware
Filed Nov. 3, 1961, Ser. No. 149,952
2 Claims. (Cl. 53—373)

This invention relates to heat sealing thermoplastic members. In one aspect this invention relates to a method for sealing thermoplastic packages utilizing a plurality of heat sources which move parallel with and synchronized with the packages to be sealed through the sealing zone and deviating the path of the heat source to cause contact with the packages. In another aspect this invention relates to an improved package sealing machine which conveys packages to be sealed along a predetermined path parallel with and synchronized with heat sealing elements which are moved into heat sealing engagement. In another aspect this invention relates to sealing units for sealing thermoplastic packages, the units comprising a heated sealing element, a carrier therefor and means to move the element relative to the carrier to produce heat sealing engagement. In yet another aspect this invention relates to a novel and improved impulse heat sealing element. In a still further aspect this invention relates to an automatic time control circuit. In another aspect this invention relates to automatic means for sealing thermoplastic films and/or packages with impulse heating elements. In yet another aspect this invention relates to the incorporation of impulse heating elements in an automatic conveyor system. In a further aspect this invention relates to an adjustable time controller.

Thermoplastic film and sheet materials are very useful for packaging many types of commodities, one well known example being food products. One of the advantages of the use of thermoplastic materials is that heat sealing can be utilized to fabricate and seal the packages, whether bags, boxes, wrapped coatings, etc. In producing satisfactory heat seals the proper combination of pressure, temperature and time is very important to make certain that the seal is made effectively and the package material is not damaged.

Heat sealing machines of the thermal impulse type provide several important advantages over the conventional heat sealing machines in which the sealing element is maintained at a constant temperature. The impulsing of the heat to the sealing element just prior to contact with the material to be sealed or during such contact permits the sealed material to cool and be consolidated under pressure. This results in an improvement in the quality of the seal. Furthermore, many materials can be heat sealed by impulse heating elements which could not be satisfactorily sealed by conventional constant temperature heating elements.

In the field of high speed packaging it is often desirable to seal as many as 100 packages per minute, and frequently an even greater number. When single impulse heating machines were utilized for this purpose, some difficulties were encountered due to the build up of heat in the heating element and its associated supporting structure. Under certain conditions, this caused the sealed layers to stick to the sealing machine and to tear.

We have now found that these difficulties can be eliminated and the desired high operating speeds can be achieved, as well as an increase in the operating speeds which are possible, through the utilization of the present invention, the essence of which is the combination of a plurality of impulse heating elements and a conveyor system. The invention also encompasses a novel and improved impulse heating element and an automatic time control circuit.

Accordingly it is an object of this invention to provide novel and improved impulse heat sealing apparatus and method. Another object of the invention is to prevent adherence of a heat sealing element and a thermoplastic unit being sealed. Another object of the invention is to provide rapid and effective thermoplastic package sealing. Yet another object of the invention is to provide an improved method and apparatus for heat sealing thermoplastic materials. Another object of the invention is to provide a novel and improved thermal impulse heating element. A still further object of the invention is to reduce expansion and shrinkage of film being sealed. Another object of the invention is to provide a time controlling circuit which can be readily varied for different time periods.

Other aspects, objects and advantages of the invention will be apparent from a study of the disclosure, the drawings and the appended claims.

Figure 3:
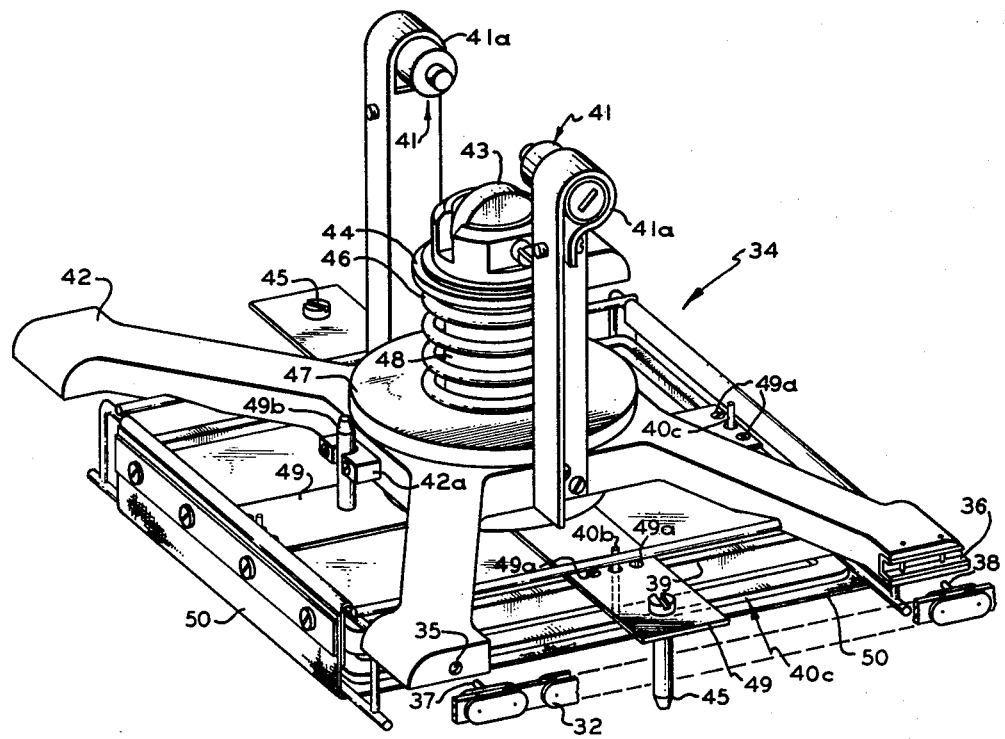
Figure 2:
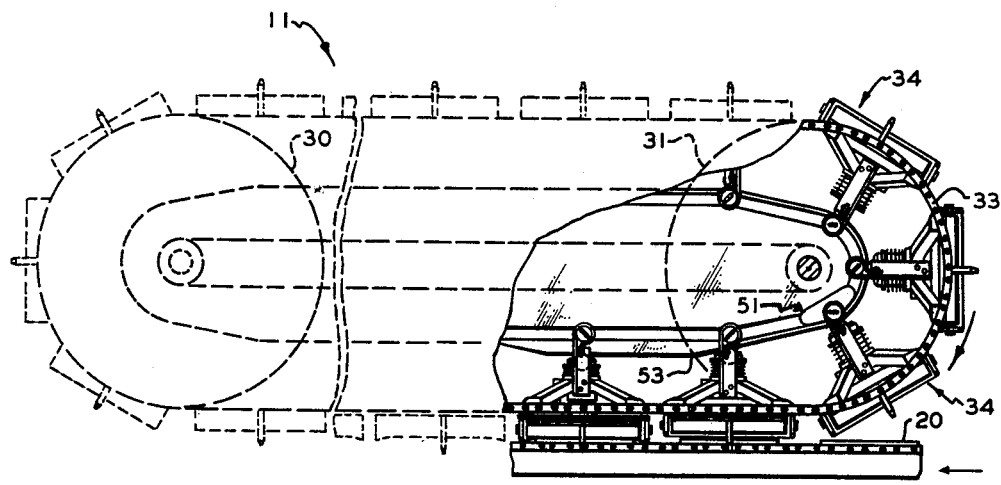
Figure 5:
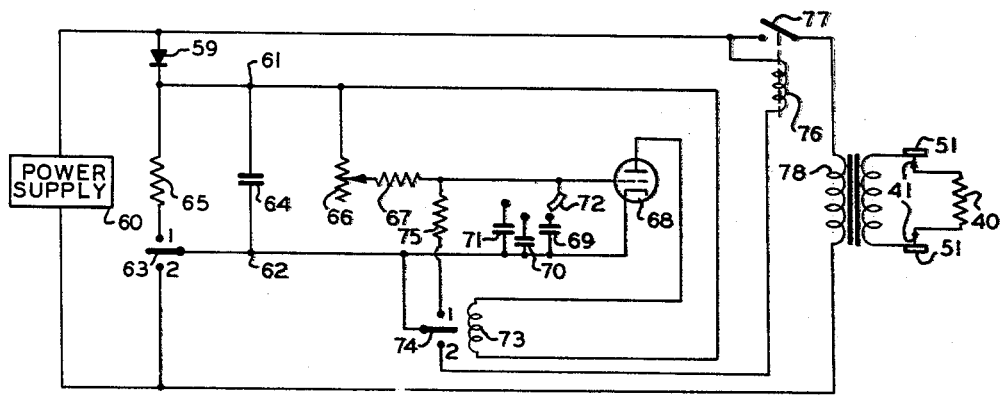
Figure 4:
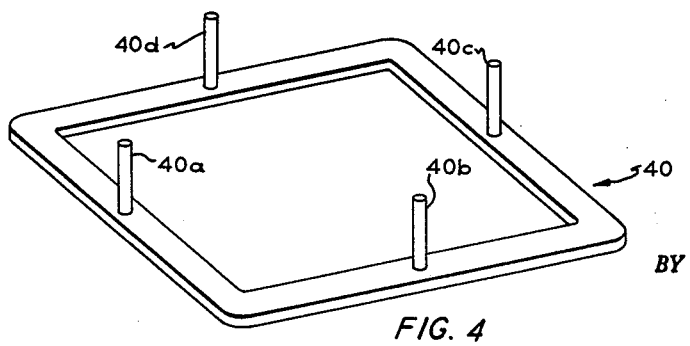

In the drawings, FIGURE 1 is a schematic isometric view of a package sealing machine according to the invention; FIGURE 2 is an elevation, partly in cross section, of that portion of the apparatus which comprises the heat sealing units and the conveying mechanism therefor; FIGURE 3 is an enlarged isometric view of a single heat sealing unit; FIGURE 4 is an isometric view of a thermal impulse heating element in accordance with the invention; and FIGURE 5 is a schematic representation of a timing control system in accordance with the invention.

As illustrated in FIGURE 1, a complete package sealing machine comprises a package conveying section 10 and a sealing element conveying section 11. Section 10 comprises chains 12 and 13, a pair of driving sprockets 14 and a second pair of sprockets 15. Supported between chains 12 and 13 are a plurality of package receptacles 16. A package delivery conveyor 17 and a package removal conveyor 18 are provided as shown, conveyor 17 delivering empty packages to the machine and conveyor 18 removing filled and sealed packages from the machine for further processing. A package filling conduit 19 feeds the desired commodity into the empty packages 20 and a film feeding roll 21 feeds a thermoplastic cover film 22. A suitable cutter is provided to separate the film into individual covers for the packages but is not shown to simplify the illustration.

Section 11 is illustrated in more detail in FIGURE 2 and comprises pairs of sprockets 30 and 31 and driving chains 32 and 33 (see FIG. 1). A plurality of sealing units 34 (see FIG. 3) are attached between chains 32 and 33 with pivotal connections 35 and sliding connections 36. Pins 37 and 38 engage pivotal connection 35 and sliding connections 36, respectively.

Sealing units 34 further comprise a movable heater support 39, impulse heating element 40 having support rods 40a, 40b, 40c, and 40d (see FIGURE 4), brush assemblies 41 held in place by clamps 41a, a cam follower roller 43, a shoulder 44 and guide pins 45. Suitable electrical connections, not shown, are made between brush assemblies 41 and support rods 40b and 40d. Heating element 40 is mounted upon, but electrically insulated from, movable heater support 39. Shoulder 44 is formed on shaft 48, and a pair of leaf springs 49 are attached to shaft 48 at the lower end thereof and to element 39 by screws 49a. Frame 42 encircles shaft 48 but is not attached thereto. A guide pin 49b is attached to one of the leaf springs 49 and cooperates with guide bracket 42a attached to frame 42. Springs 49 provide a resilient connection between element 39 and shaft 48 and thus permit some variation in the thickness of the packages being sealed and compensate for minor misalignmnt of the carrying or sealing elements. A spring 46 is compressed between shoulder 44 and shoulder 47 to urge movable heating element 40 to its retracted position. A glass cloth 50 impregnated with polytetrafluoroethylene can be attached to sealing unit 34 and extended over the sealing face of the movable heating element 40 spaced from the sealing face as shown in FIGURE 3. As illustrated in FIGURE 2, sealing element conveyor section 11 also comprises bus bars 51 (one on each side of the conveyor section 11) and elongated cam 53. A driving means 52 (see FIGURE 1) drives both package conveying section 10 and sealing element conveying section 11 through suitable chain drive assemblies to maintain the sections synchronized. Holes 45a are provided in package receptacles 16 to engage pins 45 to counteract any slight amount of lost motion in the mechanism and perfectly align sealing unit 34 with package receptacle 16.

As shown in FIGURE 4 heating element 40 can be of rectangular shape or any other desired shape to fit the container or desired sealing pattern. Heating element 40 can have any desired cross section, such as rectangular or semicircular, and can be made of a relatively thick section of resistance type material such as Hastelloy B, Nichrome 5, Inconel, Invar, Monel, and the like. It is particularly advantageous for the sealing face of heating element 40 to have a very large radius. Rods 40a, 40b, 40c and 40d should be of sufficient size to maintain reasonable rigidity for pressure sealing and should not heat appreciably. The use of heating element 40 permits a reduction in the expansion and shrinkage effects often experienced in sealing certain types of films. Such expansion or shrinkage effects often causes the sealer to wipe and sear film adjacent the seal. The use of heating element 40 also eliminates the massive heater blocks and permits the heat to be applied only in the area needed.

If desired, silicone rubber clamps lined with glass cloth or other suitable material can be used to hold the film adjacent the seal. This can also be accomplished by the use of cloth 50 of glass or other suitable material. Package carrier 16 can also be lined with a resilient material.

In operation thermoplastic packages 20 are transported by conveyor 17 and fed into package receptacles 16 of package conveying section 10. As packages 20 pass by package filling conduit 19 they receive a predetermined amount of the commodity to be packaged. The filled packages then proceed along conveying section 10 and film 22 is fed over the top of these packages. As each package, conveyed in a package receptacle 16, travels under section 11 a corresponding sealing unit 34 is positioned directly over the moving package. As the units proceed further, the roller 43 engages elongated cam 53 to move element 40 downward into engagement with the cover of the corresponding package. Guide pins 45 engage holes 45a for perfect alignment and the face of element 40 presses, through cloth 50, against the package cover thus providing the necessary heat and pressure for effecting the desired seal. Cam 53 maintains element 40 in contact with the package assembly for a period of time sufficient to obtain a satisfactory seal for the particular film thickness, sealing temperature and speed of travel of the machine.

It will be seen that brush assemblies 41, through contact with bus bars 51, provide electrical power from a suitable source 60 of electrical energy (see FIGURE 5). The length of bus bars 51 can be sufficiently short so as to permit contact with only one sealing unit at a time or sufficiently long so as to permit several sealing units to be heated at the same time. The bus bars 51 can be arranged, as shown in FIGURE 2, to heat the sealing unit 34 prior to the contact of the respective sealing unit to the film to be sealed, and/or to heat the sealing unit 34 after such contact with the film to be sealed has been made. In order to reduce the possibility of arcing, the timing of the application of the electrical impulse to bus bars 51 can be manipulated so that brush assemblies 41 contact the bus bars 51 prior to the application of the electrical impulse and such contact is maintained until after the cessation of the electrical impulse. Thus, the bus bars 51 are not subjected to a voltage potential unless the machine is in operation and the brush assemblies of one of the sealing units is in contact therewith. This is advantageous in that the machine can be readily cleaned or washed without danger from voltage on the bus bars when the machine is not in use.

After the desired contact time, determined by the length of cam 53 and the speed of the conveyor sections 10 and 11, heating element 40 is retracted by spring 46, acting against shoulders 44 and 47 through heater support 39. The sealing unit 34 proceeds on around the conveying section 11 while the now sealed package travels on toward the end of conveying section 10. Film 22 can be cut into individual cover pieces prior to, coincident with, or following the sealing operation. The sealed packages then proceed from section 10 on to package removal conveyor 18 for further handling which can include, for example, trimming, labeling, freezing, retorting, storage, transportation, etc.

Proper seal conditions are provided by controlling the length of cam 53 and the rate of travel and temperature of the heating element 40. The temperature of heating element 40 can be controlled through manipulation of the quantity of current passed through the heating element 40 and the duration of the passing of current through the heating element 40. The contact pressure can be modified by varying the compression of spring 46 and/or by adjusting cam 53 by changing the height thereof. Where desirable, suitable heating means can be provided for the packages and/or cover film.

Although the apparatus as illustrated comprises a conveyor moving in a vertical plane for transporting sealing units 34, a conveyor moving in a horizontal plane can be used also, in which case the sealing face can be oriented at right angles to the plane of the conveyor. In a preferred embodiment of the invention, shown in the drawing and described above, the path of the sealing element is deviated to cause sealing engagement. However, it is also possible to deviate the path of the package being sealed to cause sealing engagement with the sealing element and control the deviation and pressure of the sealing period.

The invention has particular utility when applied to sealing thermoplastic containers by applying thermoplastic covers and sealing the covers to the containers, but it also is applicable to sealing other types of packages, for example, bags which are sealed by joining the two edges of an open end, and wrapped objects which are sealed by joining portions of the wrapper to itself.

Although this invention is especially adapted to the use of sealing elements having a glass cloth impregnated with polytetrafluoroethylene extending over the sealing face, it also encompasses the use of other materials for the covering cloth such as, for example, a polyethylene terephthalate belt, etc., and the use of uncovered metal sealing faces where applicable.

In FIGURE 5 there is illustrated an automatic time control circuit for use in the controller 25 (see FIGURE 1). Rectifier 59 is connected between one terminal of A.C. power supply 60 and terminal 61, while terminal 62 is connected to the second terminal of power supply 60 through a two position switch 63. A capacitor 64 is connected between terminals 61 and 62 to filter out any A.C. ripple. Resistance 65 is connected between a second terminal of switch 63 and terminal 61. Potentiometer 66 and resistance 67 are connected between terminal 61 and the grid of glow discharge tube 68. Capacitors 69, 70 and 71 are connected between terminal 62 and respective terminals of three-position shorting switch 72. The other terminal of shorting switch 72 is connected to the grid of tube 68. A relay coil 73 is connected between terminal 61 and the plate of tube 68, while the cathode of tube 68 is connected to terminal 62. Coil 73 actuates relay switch 74, the switching contact of which is connected to terminal 62. A resistance 75 is connected between a first terminal of switch 74 and the grid of tube 68, while a relay coil 76 is connected between a second terminal of switch 74 and a terminal of power supply 60. Relay coil 76 actuates switch 77 which is connected in series with the primary coil of transformer 78 and power supply 60. The secondary of transformer 78 is connected between bus bars 51. Brush assemblies 41 connect heater element 40 between bus bars 51.

In operation, the movement of a sealing unit 34 by a first predetermined point on the conveyor path actuates switch 63 from position 1 to position 2. As previously mentioned, this predetermined point can be just after the brush assemblies 41 of the respective sealing unit 34 have contacted bus bars 51. When switch 63 is in position 2, a D.C. voltage is applied across glow discharge tube 68, which breaks down and conducts. When tube 68 conducts, current passes through relay coil 73, actuating switch 74 from position 1 to position 2. In position 2 switch 74 applies an A.C. voltage across relay coil 76, which then closes switch 77, thus applying an A.C. voltage across the primary of transformer 78. The output of transformer 78 can be a suitable low voltage-high amperage output such as 9 volts and 100 amps. Thus power is applied to heating element 40 to cause a rise in temperature.

When switch 74 is moved from position 1 to position 2, capacitors 69, 70 and 71 (or whatever combination thereof is connected together by shorting switch 72) begin charging through potentiometer 66 and resistance 67. When the voltage drop across the charging capacitors reaches the cutoff voltage of tube 68, tube 68 ceases conducting, thus causing switch 74 to return to position 1. This removes the voltage across coil 76 and causes switch 77 to open, thus ending the application of power to heating element 40. In position 1 switch 74 connects resistance 75 in parallel with capacitors 69, 70 and 71 (or such as are connected by switch 72) and permits the capacitors to discharge through resistance 75. This arrangement holds tube 68 in a non-conducting state for a predetermined time.

When the sealing unit 34 moves by a second predetermined point on the conveyor path (which can be just before the brush assemblies 41 break contact with bus bars 51), switch 63 is actuated to position 1, thus disconnecting the power from the timing circuit and permitting any charges built up in the circuit to discharge through resistance 65.

Potentiometer 66, resistance 67 and capacitors 69, 70 and 71 form an R.C. circuit having a variable time constant. While only three capacitors 69, 70 and 71 have been shown, and switch 72 is described as a three-position shorting switch, it is obvious that any desired number of capacitors can be utilized as a shorting switch having any desired number of positions.

*Example*

Utilizing the method and apparatus of this invention, polyethylene film of 6 mil thickness was utilized to seal open top polyethylene food containers of 20 mil thickness at a rate of approximately 100 per minute. A heat impulse of 0.55 second duration was supplied to each semicircular ⅛ inch diameter Hastelloy heating element 40 from the controller 25, transformer 78 supplying 5 volts at 125 amps. These electrical impulses heated the sealing elements from 360° F. to 405° F. with the containers being sealed in 0.7 seconds as the elements cooled from 400° F. to 397° F. Continuing movement of the sealer conveyor permitted the individual sealing units to cool to approximately 360° F. prior to their next heating impulse.

Reasonable variation and modification are possible within the scope of the disclosure, the drawing and the appended claims to the invention, the essence of which is there is provided method and apparatus for heat sealing thermoplastic materials utilizing a plurality of thermal impulse heating elements on a conveying system. In accordance with the invention there is further provided a novel automatic timing circuit having a variable time constant, and/or a novel impulse heating element.

We claim:

1. A package sealing machine comprising a first conveyor to move thermoplastic packages to be sealed along a predetermined path through a heat sealing zone, a plurality of heat sealing units, each of said sealing units comprising a thermal impulse heating element and a carrier therefor, a second conveyor to move said carriers parallel with and synchronized with said packages through said sealing zone, at least two bus bars to supply electrical power to said heating elements, brush means to transmit electrical power from said bus bars to each of said heating elements in turn, means to apply electrical energy to said bus bars only during predetermined time intervals, each of said predetermined time intervals occuring after the brush means of the respective heat sealing unit has made contact with said bus bars and before such contact is broken, thereby eliminating arcing, a spring operatively associated with each of said carriers to urge the respective heating element toward said carriers and out of contact with said packages, a cam follower mounted on each of said sealing units, an elongated cam adapted to contact the cam followers and force said heating elements from said carriers against the force of the springs to move said heating elements into sealing engagement with said packages.

2. Apparatus in accordance with claim 1 wherein said means to apply electrical energy comprises means for varying the length of said predetermined time intervals.

References Cited in the file of this patent

UNITED STATES PATENTS

| | | |
|---|---|---|
| 2,415,457 | Bruns | Feb. 11, 1947 |
| 2,478,906 | Edgerton | Aug. 16, 1949 |
| 2,530,705 | Klemperer | Nov. 21, 1950 |
| 2,738,631 | Jarund | Mar. 20, 1956 |
| 2,741,296 | Collins | Apr. 10, 1956 |
| 2,896,387 | Brock | July 28, 1959 |
| 2,916,864 | Meissner | Dec. 15, 1959 |
| 2,961,031 | Fener | Nov. 22, 1960 |
| 2,982,066 | Thompson | May 2, 1961 |
| 3,018,594 | Phillips et al. | Jan. 30, 1962 |